United States Patent
Yang (10) Patent No.: US 10,018,283 B2
(45) Date of Patent: Jul. 10, 2018

(54) WATER OUTLET STRUCTURE

(71) Applicant: YU ZHAN INTERNATIONAL CO., LTD., Taichung (TW)

(72) Inventor: Ya Hui Yang, Taichung (TW)

(73) Assignee: Yu Zhan International Co., Ltd., Taichung (TW)

( * ) Notice: Subject to any disclaimer, the term of this patent is extended or adjusted under 35 U.S.C. 154(b) by 93 days.

(21) Appl. No.: 15/234,248

(22) Filed: Aug. 11, 2016

(65) Prior Publication Data
US 2018/0045329 A1    Feb. 15, 2018

(51) Int. Cl.
F16K 27/06 (2006.01)
F16K 5/06 (2006.01)
E03C 1/04 (2006.01)
F16K 31/60 (2006.01)

(52) U.S. Cl.
CPC .............. *F16K 31/602* (2013.01); *E03C 1/04* (2013.01); *E03C 1/0403* (2013.01); *E03C 1/0404* (2013.01); *F16K 5/0642* (2013.01); *F16K 27/067* (2013.01)

(58) Field of Classification Search
CPC ........ F16K 31/302; F16K 5/06; E03C 1/0404; Y10T 137/801
See application file for complete search history.

(56) References Cited

U.S. PATENT DOCUMENTS

| | | | | |
|---|---|---|---|---|
| 3,729,034 A | * | 4/1973 | Farrell | B67C 11/04 141/297 |
| 6,449,784 B1 | * | 9/2002 | Pelletz | E03C 1/0404 137/801 |
| 7,080,821 B1 | * | 7/2006 | Su | F16K 5/0242 251/288 |
| 2006/0144454 A1 | * | 7/2006 | Abramyan | F16K 5/0605 137/887 |
| 2010/0006164 A1 | * | 1/2010 | Moncayo | E03C 1/0404 137/625 |
| 2015/0152626 A1 | * | 6/2015 | Huang | E03C 1/0404 137/119.05 |

FOREIGN PATENT DOCUMENTS

WO    WO 2008055333 A1 *  5/2008  ............... E03C 1/04

* cited by examiner

*Primary Examiner* — Marina Tietjen
(74) *Attorney, Agent, or Firm* — Rosenberg, Klein & Lee (57) ABSTRACT

A water outlet structure has an inner pipe connected to a shell. The water outlet structure is connected to a water supply pipe by a locking member. A sphere and two pads are confined in a valve room of the inner pipe. Two ends of a shaft of an operating member are connected to the sphere in the inner pipe and a valve bar. An end of the valve bar extending from the shell is connected to a cap of a handle. A toggle bar of the handle can be toggled to rotate the sphere by only 90 degrees. When the sphere is not rotated, a through hole of the sphere is not in communication with a channel of the inner pipe. When the sphere is gradually rotated and eventually by 90 degrees, the through hole is gradually aligned with the channel and in communication with the channel coaxially.

6 Claims, 10 Drawing Sheets

WATER OUTLET STRUCTURE

BACKGROUND OF THE INVENTION

Field of the Invention

The present invention relates to a water outlet structure, in particular to a water outlet structure connectable to a pipe to perform water outflow.

Description of the Prior Art

Figure 10:
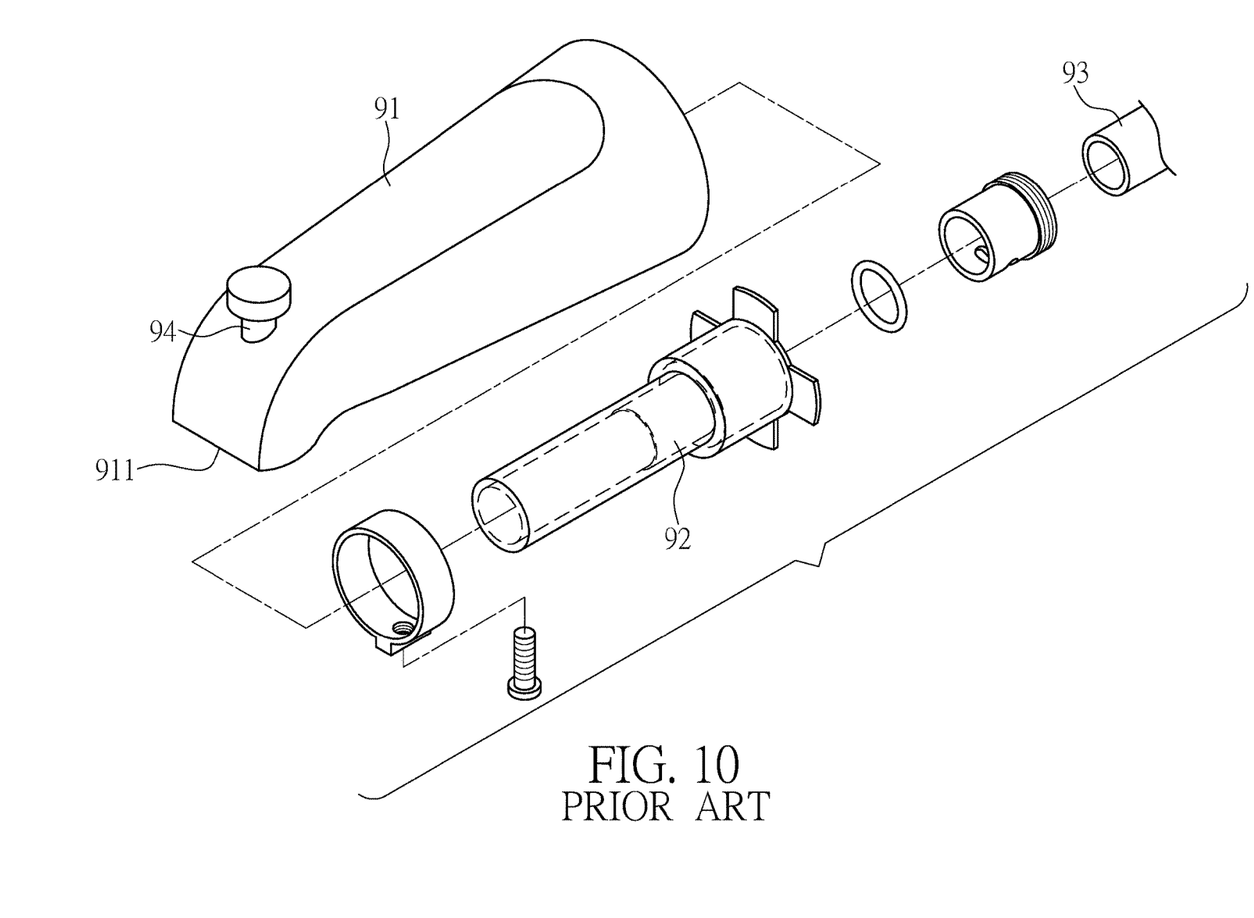
FIG. 10 illustrates a perspective view of a conventional water outlet structure.

As shown in FIG. 10, a conventional water outlet structure includes a shell 91 and an inner pipe 92 received in the shell 91. The inner pipe 92 can be connected to a supply pipe 93 for water supply. A pull bar 94 is assembled to a water outlet end 911 of the shell 91. Upon water flows out of the supply pipe 93 and flows through the inner pipe 92, when the pull bar 94 is lifted, water is blocked and not flowing out of the water outlet end 911. While when the pull bar 94 is released, water is unblocked and flowing out of the water outlet end 911.

Whether water can flow out of the water outlet end 911 or not is controlled by the location of the pull bar 94, i.e., whether the pull bar 94 is lifted or released. Even the operation of the pull bar 94 is simple to most people; some handicapped people may not perform the operation easily. Therefore, handicapped people cannot operate the conventional water outlet structure conveniently, and the structure needs to be improved.

SUMMARY OF THE INVENTION

One object of the present invention is to solve the aforementioned problems and provide a water outlet structure. A sphere is assembled in a valve room of an inner pipe received in a shell, and the sphere can be rotated by the toggling of the handle. Therefore, when a user cannot lift or release something easily but can toggle something easily, the user can operate the water outlet structure conveniently to allow water flowing out of the shell.

Another object of the prevent invention is to provide the water outlet structure in which the inner pipe is connected to the shell by a linear connecting head after the sphere and two pads are received in the valve room, rather than integrally formed with the sphere and the two pads. Therefore, prior to assembling the sphere and the two pads in the inner pipe, the structure of the inner pipe can be examined. Under this arrangement, a problem of both of the sphere and the two pads having to be discarded as well as the inner pipe encountered by an inner pipe integrally formed with a sphere and two pads can be prevented.

In view of these, the water outlet structure comprises a shell, an inner pipe, a sphere, and an operating member. The shell is hollowed and has a receiving space therein. One of two ends of the shell has a water outlet end, and the other end of the shell distant from the water outlet end has an opening. The inner pipe has a channel defined therethrough. An inlet and an outlet are respectively formed at two ends of the inner pipe. A valve room is en route of the channel. The end of the inner pipe having the outlet is connected to the shell in the receiving space. The outlet is in communication with the water outlet end. The end of the inner pipe having the inlet is positioned to the opening. A locking member is provided to the inlet of the inner pipe and adapted to lock with the inner pipe, and the locking member is connected to a water supply pipe at an assembling portion of the water outlet structure. The sphere is rotatably confined in the valve room by two pads which have spherical surfaces corresponding to the sphere. The sphere has through hole. When the sphere is not rotated, the through hole is not in communication with the channel at all, and when the sphere is gradually rotated and eventually by 90 degrees, the through hole is gradually aligned with the channel and eventually in communication with the channel coaxially. The operating member comprises a shaft, a valve bar, and a handle. The handle has a cap and a toggle bar extending from one side of the cap. The shaft passes through the inner pipe and one of two ends of the shaft is connected to the sphere in the inner pipe along a radial direction of the through hole, and the other end of the shaft is extending out of the inner pipe and coaxially connected to one of two ends of the valve bar. The other end of the valve bar is extending out of the shell and connected to the cap. when the toggle bar is toggled, the valve bar and the shaft drive the sphere to rotate by only 90 degrees.

In one embodiment, the inner pipe has an annular wall around a periphery of a portion from which the shaft is extending, a top of the annular wall has a recess having a semicircular profile, the annular wall forms two first blocking surfaces at the recess, and the two first blocking surfaces are angled by 180 degrees, the end of the valve bar connected to the shaft has a protrusion having a quadrant profile, the protrusion has two second blocking surface at two opposite sides thereof, and the two second blocking surfaces are angled by 90 degrees, when the valve bar is connected to the shaft, the protrusion is inserted into the recess, and when the two second blocking surfaces of the protrusion are respectively blocked by the two first blocking surfaces, a rotation of the valve bar stops, so that the rotatable angle of the valve bar is confined to be only 90 degrees.

In one embodiment, the shaft comprises a seal ring fitting over the inner pipe to prevent from water leakage from a portion of the inner pipe the shaft is assembled to.

In one embodiment, the inner pipe has a first inner thread on the inlet thereof and a second inner thread on the outlet thereof, the shell has a third inner thread at a connecting portion corresponding to the end of the inner pipe having the outlet, a linear connecting head respectively has a first outer thread and a second outer thread at two ends thereof, after the sphere and the two pads are assembled in the valve room, the first outer thread of the linear connecting head is threaded with the second inner thread, and the second outer thread of the linear connecting head is threaded with the third inner thread, so that the inner pipe is connected to the shell, the locking member has a third outer thread threaded with the first inner thread and positioned at the inlet of the inner pipe, and the locking member has a fourth inner thread.

In one embodiment, a seal ring is fitting over the linear connecting head, the seal ring is threaded into the second inner thread along with the first outer thread and placed in the outlet of the inner pipe to prevent from water leakage from a threaded portion between the first outer thread and the second inner thread.

In one embodiment, the end of the shaft the inner pipe is extending from has a first combining portion having a non-circular profile, the end of the valve bar coaxially connected to the shaft has a second combining portion, a profile of the second combining portion mates with a profile of the first combining portion, so that the first combining portion is combinable with the second combining portion and rotated along with the rotation of the second combining portion, the end of the valve bar distant form the shaft has a third combining portion having a non-circular profile, the cap has a fourth combining portion, a profile of the fourth combining portion mates with a profile of the third combining portion, so that the third combining portion is combinable with the fourth combining portion and rotated along with the rotation of the fourth combining portion.

In one embodiment, the cap has a groove, when the third combining portion of the valve bar and the fourth combining portion of the cap correspond to each other and combined with each other, a bolt passes through the grove and locks the cap to the valve bar, and a plug is provided to cover the groove.

DETAIL PORTIONED DESCRIPTION OF THE PREFERRED EMBODIMENTS

Please refer to FIGS. 1 to 9, which illustrate a water outlet structure according to embodiments of the present invention. The embodiments are provided for illustrative purposes only and not formed as limitations of the present invention.

Figure 1:
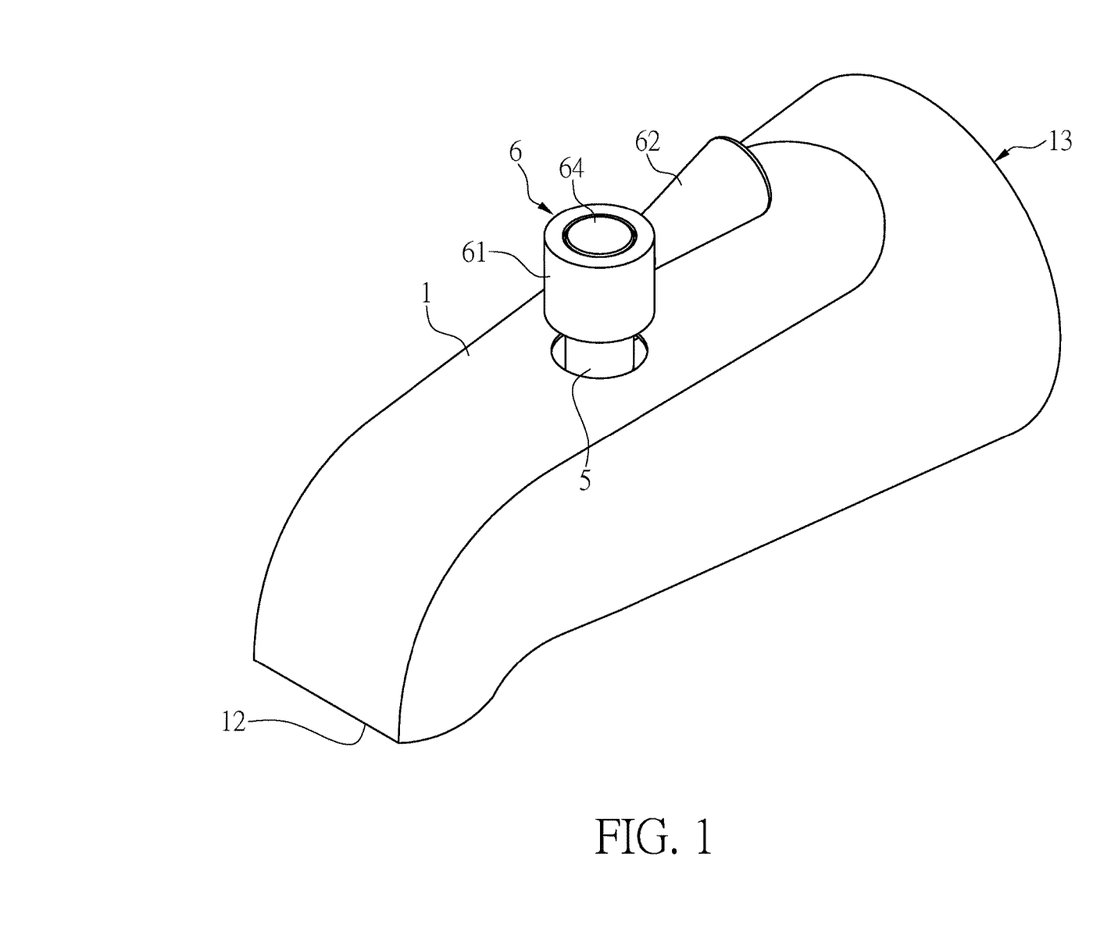
FIG. 1 illustrates a perspective view of a water outlet structure according to an exemplary embodiment of the present invention.
Figure 2:
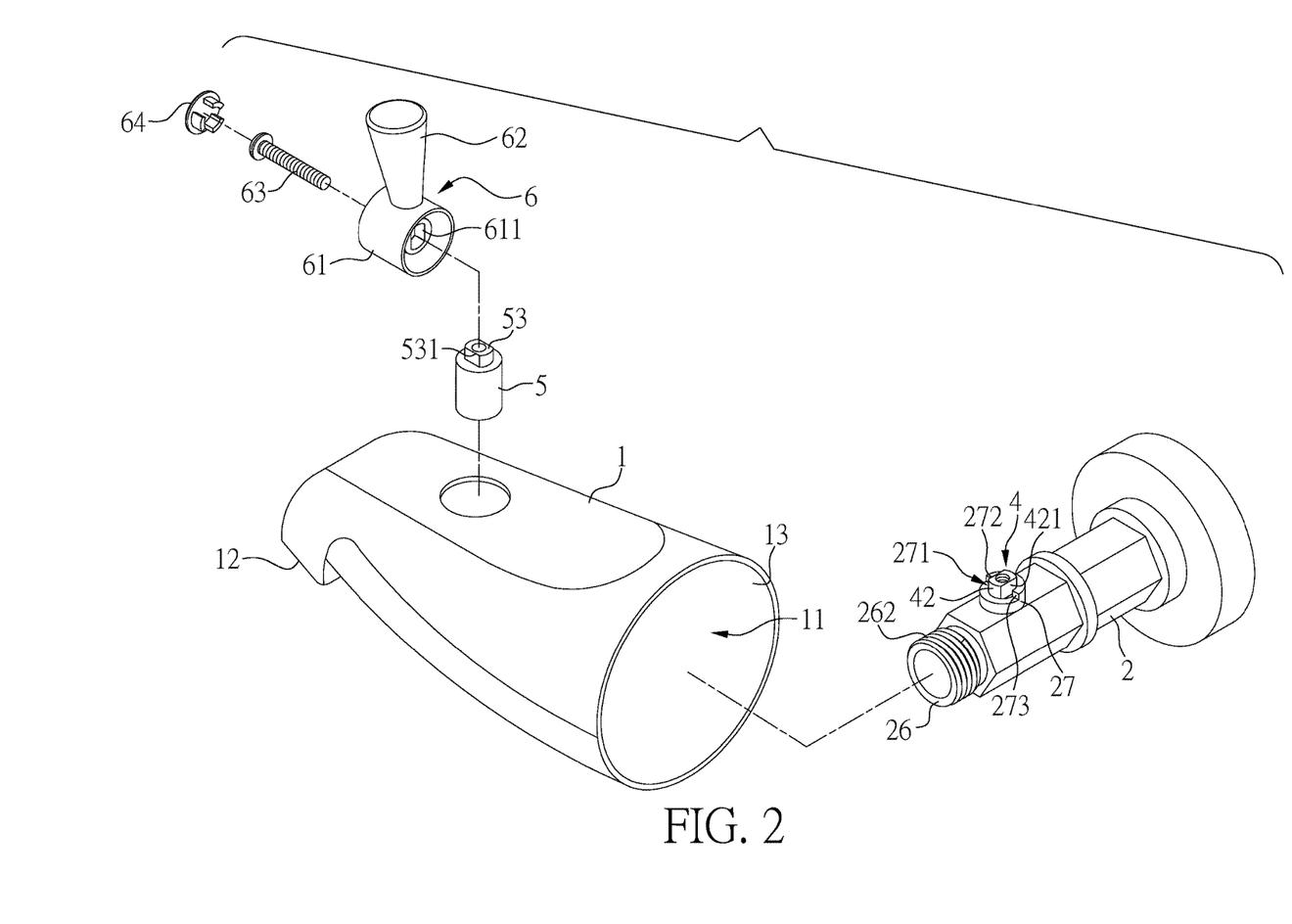
FIG. 2 illustrates an exploded view of a shell, an inner pipe, and an operating member of the water outlet structure to be assembled with each other.
Figure 3:
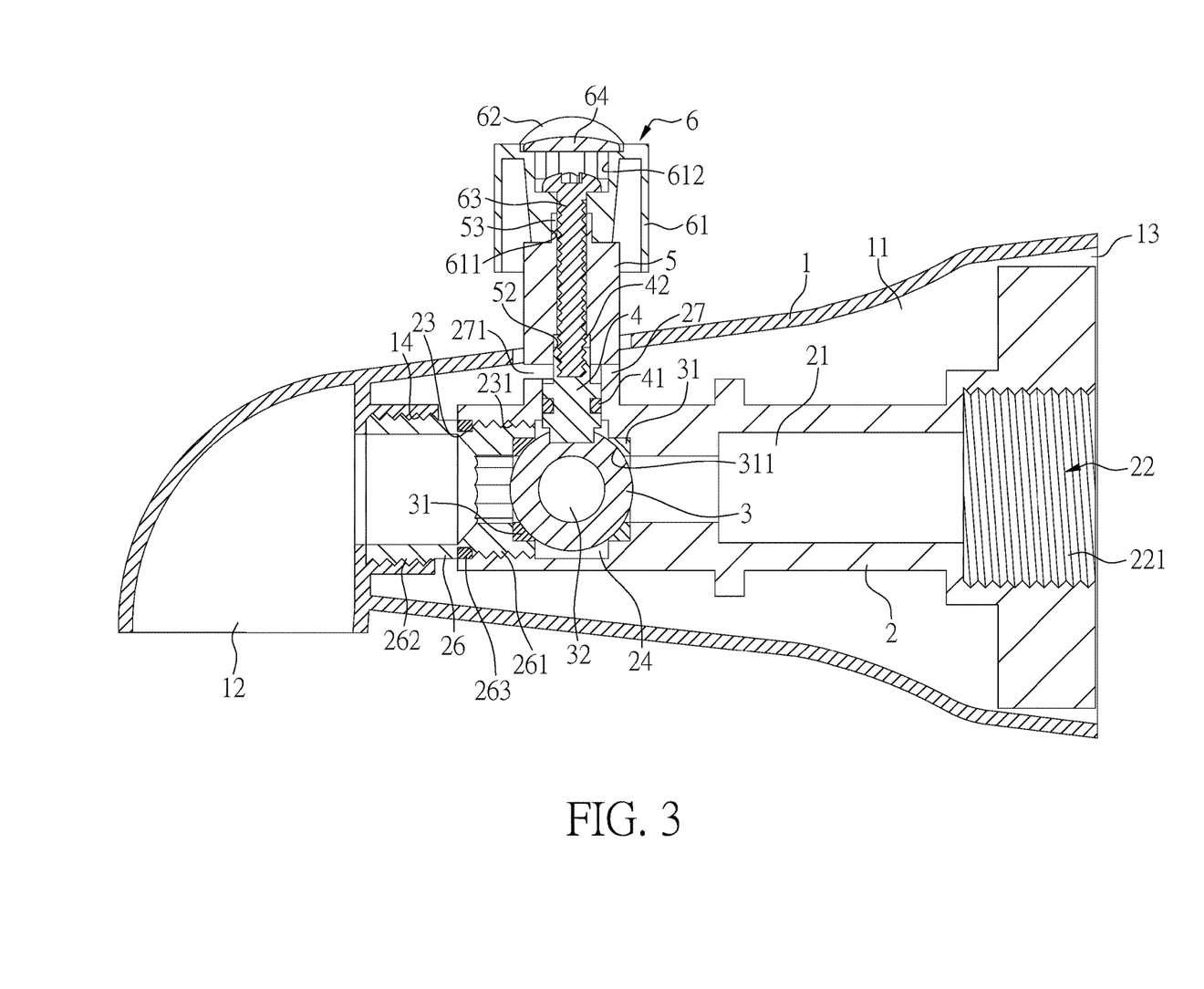
FIG. 3 illustrates a sectional view of the water outlet structure, wherein the through hole of the sphere is not in communication with the channel at all.

In the embodiment, a water outlet structure is provided. As shown in FIGS. 1 to 3, the water outlet structure comprises a shell 1, an inner pipe 2, a sphere 3, and an operating member. The operating member comprises a shaft 4, a valve bar 5, and a handle 6.

As shown in FIGS. 1 to 3, the shell 1 is hollowed and has a receiving space 11 therein. One of two ends of the shell 1 has a water outlet end 12, and the other end of the shell 1 distant from the water outlet end 12 has an opening 13. The inner pipe 2 has a channel 21. The channel 21 is defined through the inner pipe 2, and an inlet 22 and an outlet 23 are respectively formed at two ends of the inner pipe 2. A valve room 24 is en route of the channel 21, the end of the inner pipe 2 having the outlet 23 is connected to the shell 1 in the receiving space 11, the outlet 23 is in communication with the water outlet end 12, and the end of the inner pipe 2 having the inlet 22 is positioned to the opening 13.

Figure 6:
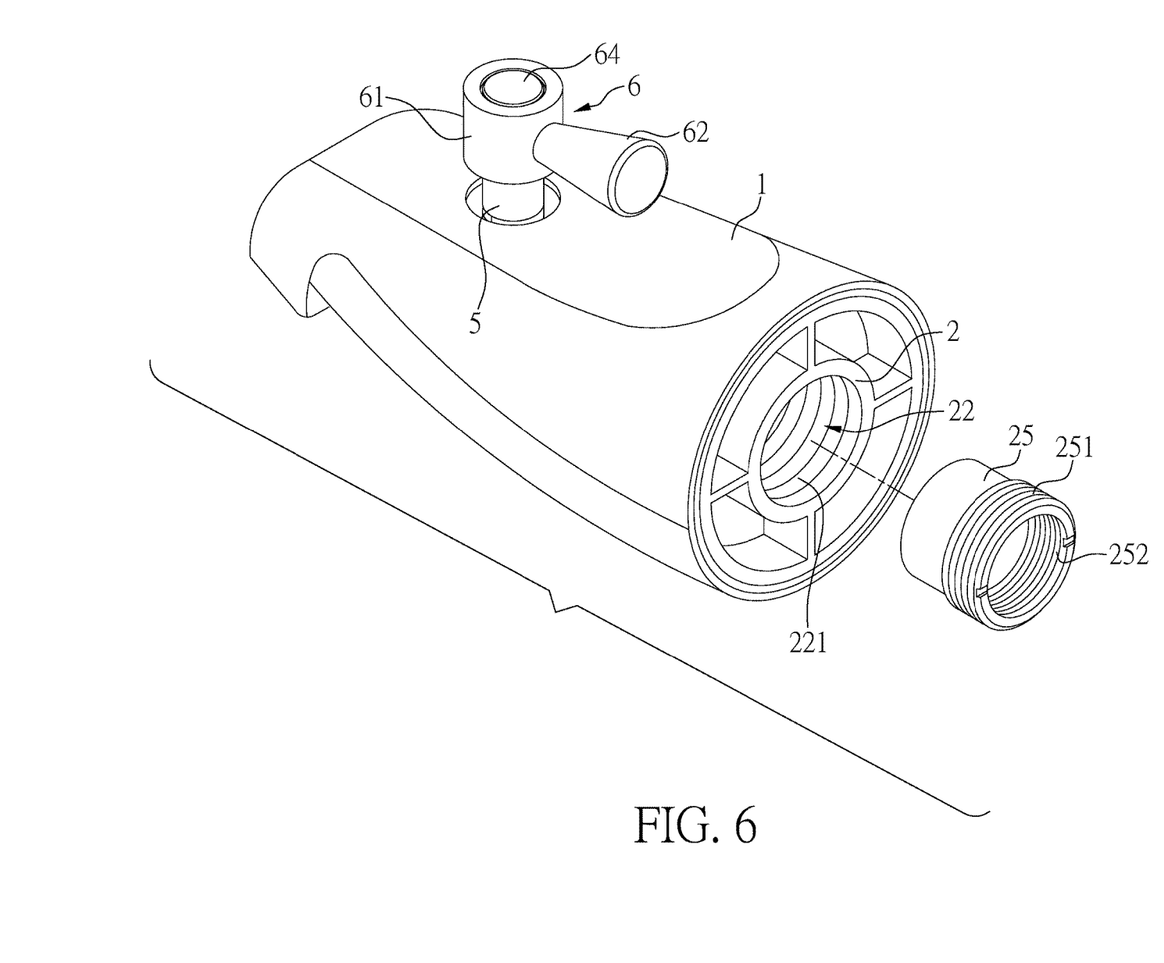
FIG. 6 illustrates a schematic view of the water outlet structure showing a locking member at an inlet of the inner pipe.
Figure 7:
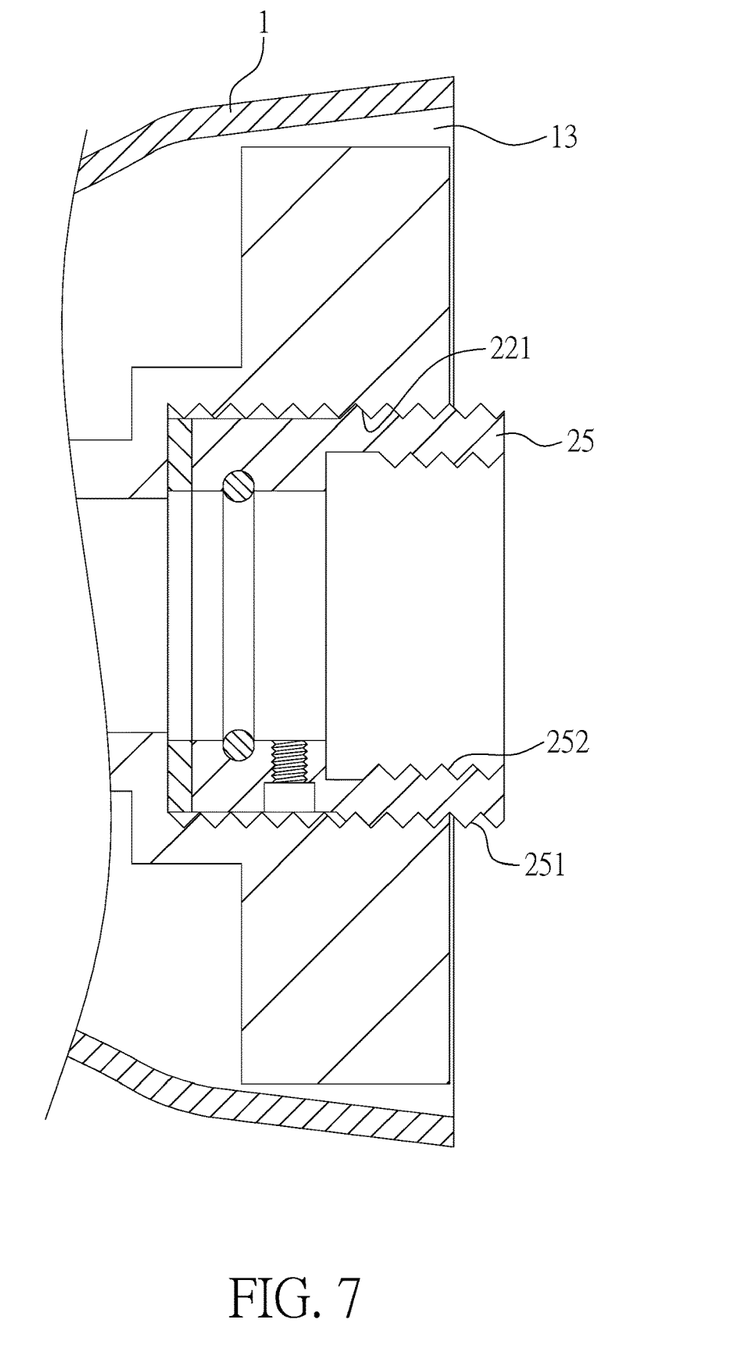
FIG. 7 illustrates a partial sectional view of FIG. 6.
Figure 8:
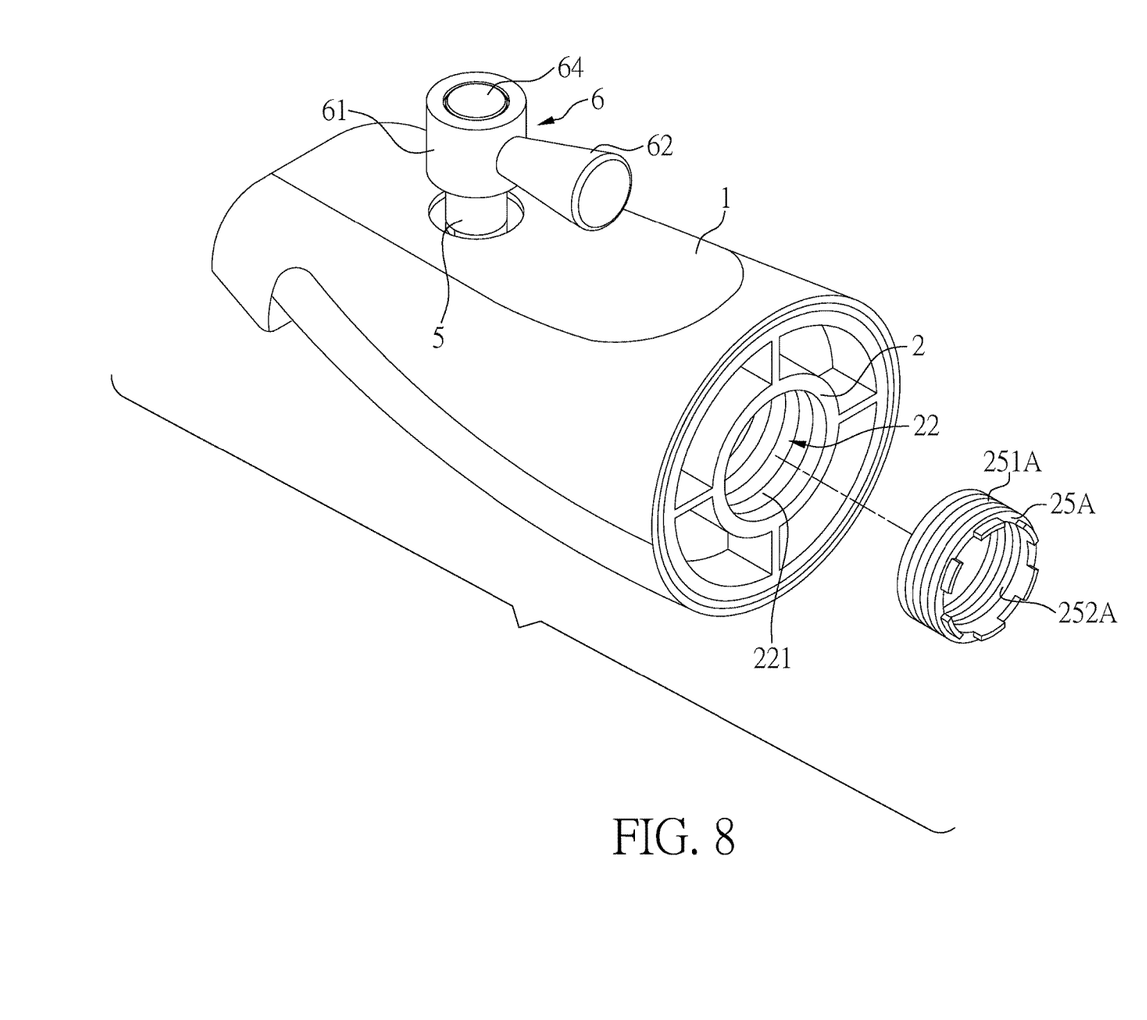
FIG. 8 illustrates a schematic view of the water outlet structure showing another locking member at the inlet of the inner pipe.
Figure 9:
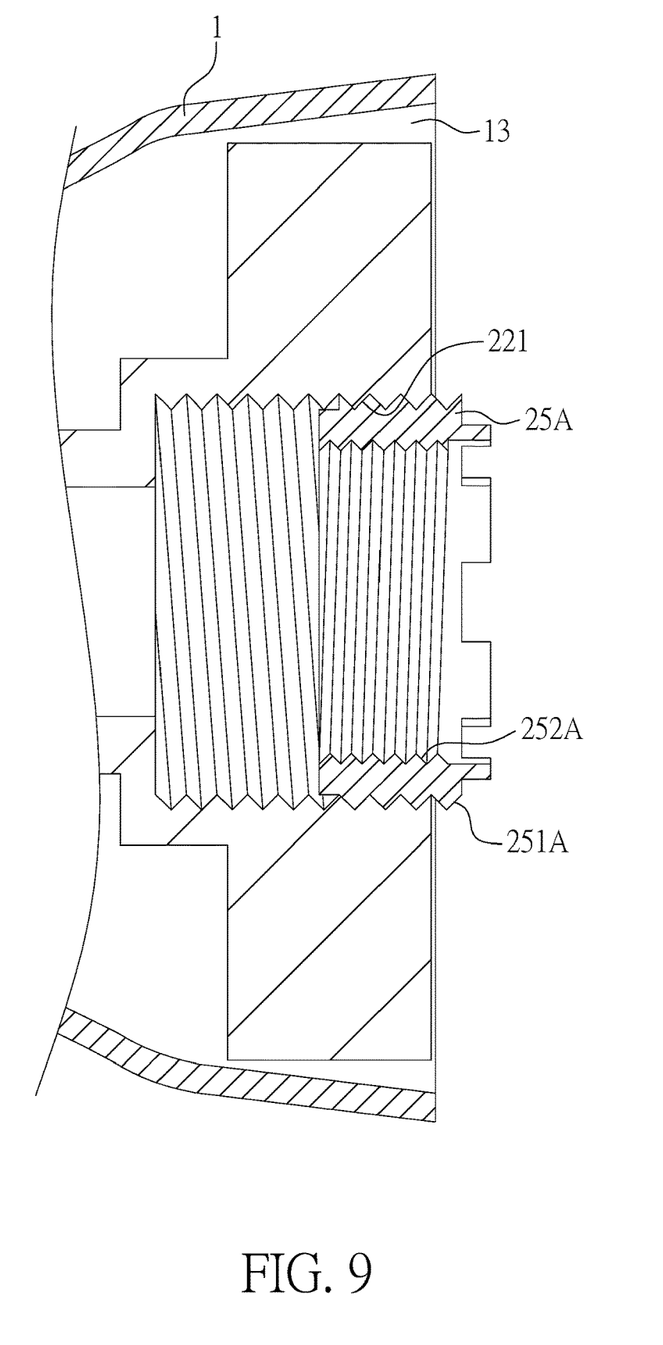
FIG. 9 illustrates a partial sectional view of FIG. 8.

As shown in FIGS. 6 and 7, a locking member 25 is provided to the inlet 22 of the inner pipe 2 and adapted to lock with the inner pipe 2, and the locking member 25 is connected to a water supply pipe at an assembling portion of the water outlet structure. As shown in FIGS. 8 and 9, another locking member 25A is provided to the inlet 22 of the inner pipe 2 and adapted to lock with the inner pipe 2. Since both the locking member 25 and the locking member 25A can be locked with the inner pipe 2, the structure of the locking member 25/25A may be changed.

As shown in FIG. 3, the sphere 3 is rotatably confined in the valve room 24 by two pads 31. Each of the pads 31 has a spherical surface 311 corresponding to the sphere 3. The sphere 3 has a through hole 32. When the sphere 3 is not rotated, the through hole 32 is not in communication with the channel 21 at all; while when the sphere 3 is gradually rotated and eventually by 90 degrees, the through hole 32 is gradually aligned with the channel 21 and eventually in communication with the channel 21 coaxially.

As shown in FIGS. 2 to 3, in this embodiment, the inner pipe 2 has a first inner thread 221 on the inlet 22 thereof and a second inner thread 231 on the outlet 23 thereof. The shell 1 has a third inner thread 14 at a connecting portion corresponding to the end of the inner pipe 2 having the outlet 23. A linear connecting head 26 respectively has a first outer thread 261 and a second outer thread 262 at two ends thereof. After the sphere 3 and the two pads 31 are assembled in the valve room 24, the first outer thread 261 of the linear connecting head 26 is threaded with the second inner thread 231, and the second outer thread 262 of the linear connecting head 26 is threaded with the third inner thread 14, so that the inner pipe 2 is connected to the shell 1. The locking member 25 has a third outer thread 251 threaded with the first inner thread 221 and positioned at the inlet 22 of the inner pipe 2, and the locking member 25 has a fourth inner thread 252.

As shown in FIGS. 2 to 3, the handle 6 has a cap 61 and a toggle bar 62. The toggle bar 62 is extending from one side of the cap 61. The shaft 4 passes through the inner pipe 2, one of two ends of the shaft 4 is connected to the sphere 3 in the inner pipe 2 along a radial direction of the through hole 32, and the other end of the shaft 4 is extending out of the inner pipe 2 and coaxially connected to one of two ends of the valve bar 5. The other end of the valve bar 5 is extending out of the shell 1 and connected to the cap 61. When the toggle bar 62 is toggled, the valve bar 5 and the shaft 4 drive the sphere 3 to rotate by 90 degrees.

Figure 4:
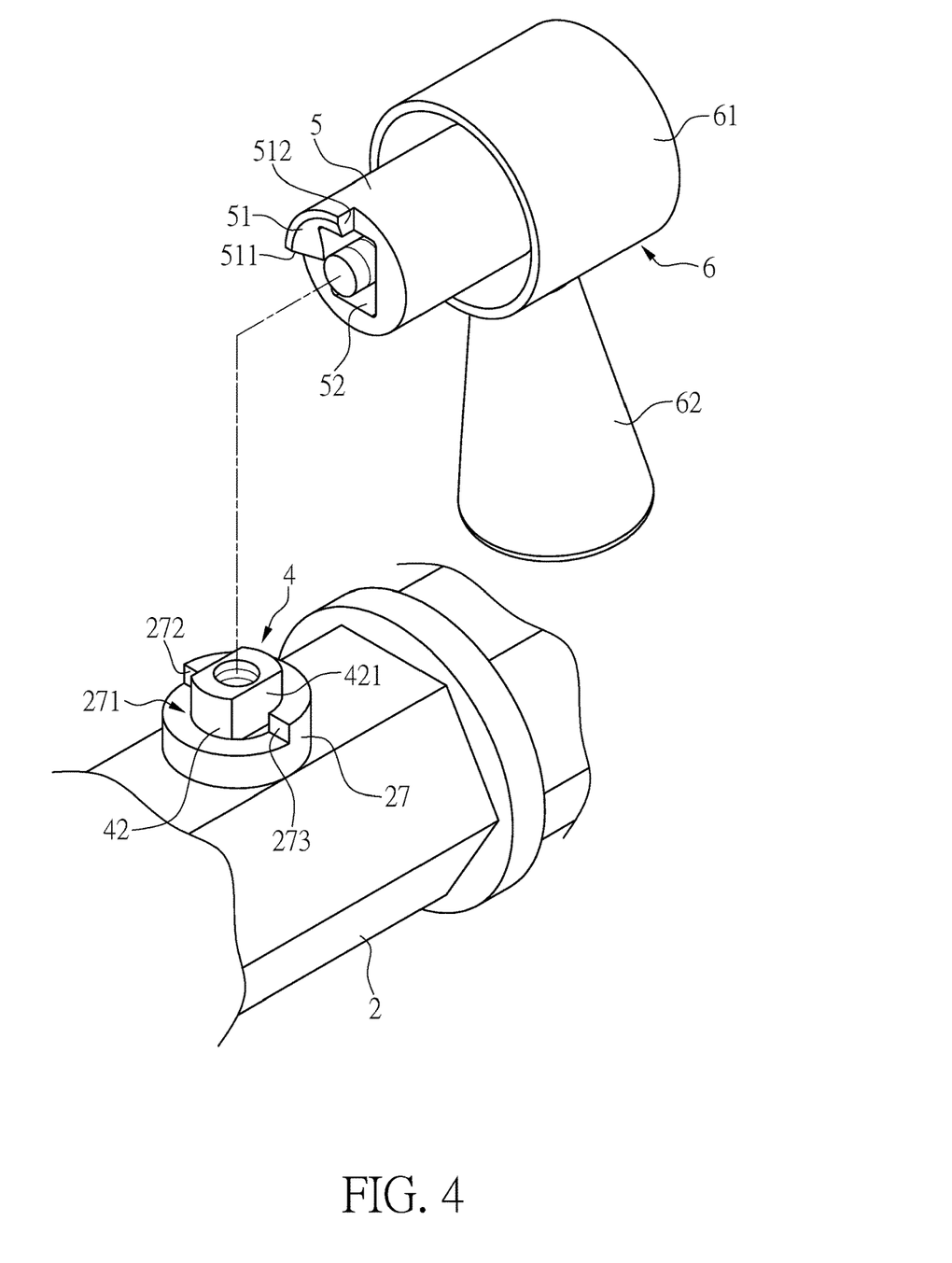
FIG. 4 illustrates an exploded view of a shaft and a valve bar of the water outlet structure.

As shown in FIGS. 2 and 4, the inner pipe 2 has an annular wall 27 around a periphery of a portion from which the shaft 4 is extending. A top of the annular wall 27 has a recess 271 having a semicircular profile. The annular wall 27 forms two first blocking surfaces 272, 273 at the recess 271, and the two first blocking surfaces 272, 273 are angled by 180 degrees. The end of the valve bar 5 connected to the shaft 4 has a protrusion 51 having a quadrant profile, the protrusion 51 has two second blocking surfaces 511, 512 at two opposite sides thereof, and the two second blocking surfaces 511, 512 are angled by 90 degrees. When the valve bar 5 is connected to the shaft 4, the protrusion 51 is inserted into the recess 271. When the second blocking surface 511 of the valve bar 5 is blocked by the first blocking surface 272, a rotation of the valve bar 5 stops. Likewise, when the second blocking surface 512 of the valve bar 5 is blocked by the first blocking surface 273, the rotation of the valve bar 5 stops. Accordingly, the rotatable angle of the valve bar 5 is confined to be only 90 degrees.

As shown in FIGS. 2 to 4, in this embodiment, the shaft 4 has a seal ring 41 being fit on the shaft 4 and disposed between the shaft 4 and a portion of the inner pipe 2 to prevent water leakage from the portion of the inner pipe 2 into which the shaft 4 is assembled. In addition, a seal ring 263 is fitting over the linear connecting head 26. The seal ring 263 is threaded into the second inner thread 231 along with the first outer thread 261 and placed in the outlet 23 of the inner pipe 2 to prevent water leakage from a threaded portion between the first outer thread 261 and the second inner thread 231.

As shown in FIGS. 2 to 4, in this embodiment, the end of the shaft 4 the inner pipe 2 is extending from has a first combining portion 42. As shown, the first combining portion 42 has a non-circular profile, and in this embodiment, the first combining portion 42 has truncated circle profile and has two flat surfaces 421 at two opposite sides thereof. The end of the valve bar 5 coaxially connected to the shaft 4 has a second combining portion 52. The profile of the second combining portion 52 mates with the profile of the first combining portion 42, so that the first combining portion 42 is combinable with the second combining portion 52 and rotated along with the rotation of the second combining portion 52. In this embodiment, the first combining portion 42 is protruding and the second combining portion 52 is recessed. In addition, the end of the valve bar 5 distant from the shaft 4 has a third combining portion 53. As shown, the third combining portion 53 has a non-circular profile, and in this embodiment, the third combining portion 53 has truncated circle profile and has two flat surfaces 531 at two opposite sides thereof. The cap 61 has a fourth combining portion 611. The profile of the fourth combining portion 611 mates with the profile of the third combining portion 53, so that the third combining portion 53 is combinable with the fourth combining portion 611 and rotated along with the rotation of the fourth combining portion 611. In this embodiment, the third combining portion 53 is protruding and the fourth combining portion 611 is recessed.

As shown in FIGS. 2 and 3, in this embodiment, the cap 61 has a groove 612. When the third combining portion 53 of the valve bar 5 and the fourth combining portion 611 of the cap 61 correspond to each other and combined with each other, a bolt 63 passes through the groove 612 and locks the cap 61 to the valve bar 5, and a plug 64 is provided to cover the groove 612.

Figure 5:
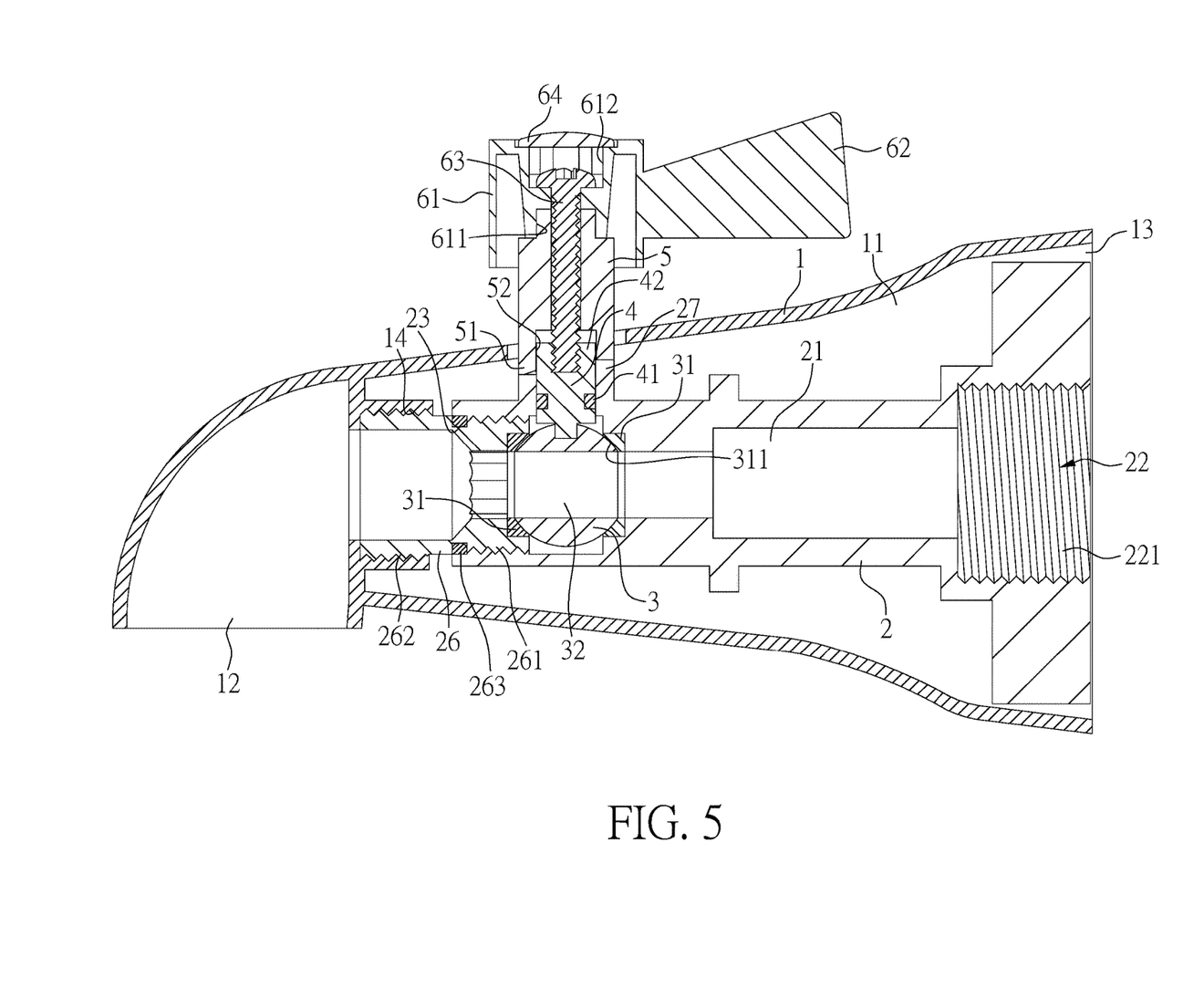
FIG. 5 illustrates another sectional view of the water outlet structure, wherein the through hole of the sphere is coaxially in communication with the channel.

In the assembly of the water outlet structure, the sphere 3 and the two pads 31 are received in the inner pipe 2, and the seal ring 263 is fitted over the linear connecting head 26 and locked in the inner pipe 2, so that the sphere 3 and the two pads 31 are confined in the valve room 24. Moreover, the shaft 4 is connected to the sphere 3, the valve bar 5 is connected to the shaft 4, and the cap 61 is locked with the valve bar 5 by the bolt 63. Therefore, the water outlet structure can be connected to a water supply pipe by the locking member 25. When the relative position between the sphere 3 and the toggle bar 62 is configured as shown in FIG. 3, the through hole 32 is not in communication with the channel 21 in the valve room 24, and water will be blocked by the sphere 3 and not flowing out of the water outlet end 12. When a user needs water, he or she can toggle the toggle bar 62 to allow the through hole 32 and the channel 21 being in communication with each other in the valve room 24, as shown in FIG. 5; moreover, the user may toggle the toggle bar 62 by 90 degrees to allow the through hole 32 to be aligned with the channel 21 coaxially, and the amount of water flowing out of the water outlet end 12 can be maximized. Accordingly, by operating the toggle bar 62, water can flow out of the water outlet end 12, and the toggle bar 62 can be operated by different angles to control the amount of water flowing out of the water outlet end 12.

The present invention has several advantages.

Firstly, as described above, whether water is flowing out of the water outlet end 12 through the channel 21 or not is determined by togging the toggle bar 62 which allow the shaft 4 and the valve bar 5 to drive the sphere 3 to rotate, so that the through hole 32 of the sphere 3 can be in communication with or not in communication with the channel 21. As compared with the conventional design having the pull bar 94 to be lifted or released, the toggle bar 62 in the present invention is operated by toggling, and the toggling angle is only 90 degrees. Therefore, when a user cannot lift or release something easily but can toggle something easily, the user can operate the water outlet structure conveniently, and the user can realize if water will flow out of the water outlet end 12 or not by the position of the toggle bar 62.

Secondly, the inner pipe 2 is connected to the shell 1 by the linear connecting head 26 after the sphere 3 and the two pads 31 are received in the valve room 24, rather than integrally formed with the sphere 3 and the two pads 31. Therefore, prior to assembling the sphere 3 and the two pads 31 in the inner pipe 2, the structure of the inner pipe 2 can be examined. Under this arrangement, a problem of both of the sphere 3 and the two pads 31 having to be discarded as well as the inner pipe 2 encountered by an inner pipe integrally formed with a sphere and two pads can be prevented.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A water outlet structure, comprising:
a shell, hollowed and having a receiving space therein, wherein one of two ends of the shell has a water outlet end, and the other end of the shell distant from the water outlet end has an opening;
an inner pipe having a channel, wherein the channel is defined through the inner pipe, and an inlet and an outlet are respectively formed at two ends of the inner pipe, a valve room is en route of the channel, the end of the inner pipe having the outlet is connected to the shell in the receiving space, the outlet is in communication with the water outlet end, the end of the inner pipe having the inlet is positioned to the opening, a locking member is provided to the inlet of the inner pipe and adapted to lock with the inner pipe, and the locking member is connected to a water supply pipe at an assembling portion of the water outlet structure;
a sphere rotatably confined in the valve room by two pads which have spherical surfaces corresponding to the sphere, wherein the sphere has a through hole, wherein when the sphere is not rotated, the through hole is not in communication with the channel at all, and when the sphere is gradually rotated and eventually by 90 degrees, the through hole is gradually aligned with the channel and eventually in communication with the channel coaxially;
an operating member, comprising a shaft, a valve bar, and a handle, wherein the handle has a cap and a toggle bar extending from one side of the cap, the shaft passes through the inner pipe and a first end of the shaft is connected to the sphere in the inner pipe along a radial direction of the through hole, and a second opposing end of the shaft extends through an opening in the inner pipe and is coaxially connected to one of two ends of the valve bar, the other end of the valve bar extends out of the shell and is connected to the cap, and wherein when the toggle bar is toggled, the valve bar and the shaft drive the sphere to rotate by 90 degrees, the second end of the shaft has a first combining portion with a non-circular profile, the end of the valve bar coaxially connected to the second end of the shaft has a second combining portion, a profile of the second combining portion mates with the non-circular profile of the first combining portion, so thereby rotate the first combining portion concurrently with rotation of the second combining portion, the end of the valve bar distant form the shaft has a third combining portion having a non-circular profile, the cap has a fourth combining portion, a profile of the fourth combining portion mates with the non-circular profile of the third combining portion, so that the third combining portion is rotated concurrently with the rotation of the fourth combining portion.

2. The water outlet structure according to claim 1, wherein the opening in the inner pipe has an annular wall around a periphery thereof, a top of the annular wall has a recess having a semicircular profile, the annular wall forms two first blocking surfaces at the recess, and the two first blocking surfaces are angled by 180 degrees, the end of the valve bar connected to the second end of the shaft has a protrusion having a quadrant profile, the protrusion has two second blocking surface at two opposite sides thereof, and the two second blocking surfaces are angled by 90 degrees, when the valve bar is connected to the second end of the shaft, the protrusion is inserted into the recess, and when the two second blocking surfaces of the protrusion are respectively blocked by the two first blocking surfaces, a rotation of the valve bar stops, so that the rotatable angle of the valve bar is confined to be only 90 degrees.

3. The water outlet structure according to claim 2, wherein a seal ring is fit over the shaft and disposed between the shaft and an interior surface of the inner pipe to prevent water leakage from a portion of the inner pipe into which the shaft is assembled.

4. The water outlet structure according to claim 1, wherein the inner pipe has a first inner thread on the inlet thereof and a second inner thread on the outlet thereof, the shell has a third inner thread at a connecting portion corresponding to the end of the inner pipe having the outlet, a linear connecting head respectively has a first outer thread and a second outer thread at two ends thereof, after the sphere and the two pads are assembled in the valve room, the first outer thread of the linear connecting head is threaded with the second inner thread, and the second outer thread of the linear connecting head is threaded with the third inner thread, so that the inner pipe is connected to the shell, the locking member has a third outer thread threaded with the first inner thread and positioned at the inlet of the inner pipe, and the locking member has a fourth inner thread.

5. The water outlet structure according to claim 4, wherein a seal ring is fit over the linear connecting head, the seal ring is threaded into the second inner thread along with the first outer thread and placed in the outlet of the inner pipe to prevent water leakage from a threaded portion between the first outer thread and the second inner thread.

6. The water outlet structure according to claim 1, wherein the cap has a groove, when the third combining portion of the valve bar and the fourth combining portion of the cap correspond to each other and combined with each other, a bolt passes through the grove and locks the cap to the valve bar, and a plug is provided to cover the groove.

* * * * *